United States Patent Office 3,442,557
Patented May 6, 1969

3,442,557
LOAD-RESPONSIVE BRAKE-FORCE PROPORTIONING DEVICE FOR VEHICULAR BRAKE SYSTEM
Heinrich Oberthur, Offenbach-Rumpenheim, Germany, assignor to Alfred Teves G.m.b.H., Frankfurt am Main, Germany, a corporation of Germany
Filed Oct. 11, 1967, Ser. No. 674,479
Claims priority, application Germany, Oct. 18, 1966, T 32,298
Int. Cl. B60t 8/18, 8/02
U.S. Cl. 303—22                     10 Claims

ABSTRACT OF THE DISCLOSURE

A brake-force proportioning valve in which the valve housing is mounted on a vehicle body or chassis and has a differential-piston plunger (i.e., a dual-diameter piston) shiftable in a step bore of the housing to control a spring-loaded metering valve within the plunger, a control lever in the form of a horizontal bar being fulcrumed at a knife edge or roller on the plunger and being of unitary construction, a spring is adjustably tensionable to connect one end of the lever to the housing of the valve or the body while an adjustable-length anchor has an eye receiving a pintle at the other end of the lever for defining therewith a pivotable axis fixed to the axle housing which moves relative to the body upon changes in the loading thereof.

---

My present invention relates to a load-responsive brake-force-proportioning device for a vehicular-brake system and, more particularly, to a braking-force regulator adapted to be mounted in a wide variety of vehicle structures and which is practically independent of the body and axle-assembly configurations.

In my prior patents, Nos. 3,290,882, 3,233,947, 3,169,800 and 3,167,360, I describe a variety of load-responsive braking-force regulators of the general type wherein a differential-piston plunger is urged by brake-fluid pressure away from its rest position against a resilient force proportional to the load carried by the vehicle, to block direct communication between the master cylinder and the wheel-brake cylinders and interpose therebetween a step piston or plunger whereby the plunger transfers force from the master cylinder to the wheel brakes and applies pressure to the latter in dependence upon the ratio of the surface areas. In others of these systems, the load-responsive character of the valve derives from the transformation of the relative movement between the vehicle body and an axle housing into a positioning of the valve body and its springs. These systems, while highly effective for certain vehicle constructions and types, have the disadvantage that they require bipartite and multipartie lever arrangements in which the several arms are joined together with friction couplings, complex spring assemblies, precise positioning of the valve housings and levers, etc.

It is the principal object of the present invention to provide a proportioning device of the general character described in which the disadvantages mentioned above are avoided and the device has substantially universal applicability to most vehicle structures.

Another object of this invention is to provide a braking-force regulator which is insensitive to the inclination of the proportioning-valve housing and which does not require complex lever constructions to sense changes in loading of the vehicle.

A further object of my invention is to provide a braking-force regulator of relatively low cost, ease of assembly and simple adjustability.

I have found that these objects can be attained in a load-responsive brake-force proportioning valve for a vehicular brake system having a master cylinder and at least one set of fluid-actuated wheel brakes as well as a vehicle body and an axle assembly suspended from the body in such manner that changes in the load carried thereby are reflected in variable distances between the axle assembly and the body portion, the valve comprising a housing which is mounted upon the body portion (i.e., the vehicle frame or chassis) and having a plunger of the dual-diameter or differential-piston type previously described and carrying a metering valve whose function is similar to that set forth in my prior patents mentioned earlier. The present invention resides in controlling the valve by an external lever which is unitary (i.e., formed from a single piece and integral) and is fulcrumed on the plunger while one end of the lever (forming a first arm between this end and the fulcrum) is connected to the housing of the valve and, therefore, the body of the vehicle by an adjustable tension spring whose adjustment means is mounted upon the valve housing, while the other end of the lever (forming the second arm) is connected by a pintle to the eye of the anchor affixed to the axle housing. The anchor has a telescoping shank of adjustable length to set the position of the pivotal axis relative to the housing and the axle while the latter and the valve housing or both may be provided with an adjustment point in the form of a bore as described in greater detail hereinafter. The double-arm lever is here a simple horizontal beam whose fulcrum may be formed by a roller fixed to the beam and rotatable in a journaled block carried by the plunger and advantageously forming an elastomeric cushion. When the fulcrum is a knife edge, according to this invention, an antifriction member may be provided in a similar manner via the elastomeric cushion. The adjusting point for setting the device may be a bore provided in the double-arm lever which is connectable by a bridge-like spacer gauge with the valve housing to fix the position of the lever bore relatively thereto for a given vehicle load.

To prevent the penetration of contaminants, moisture and grease into the housing, I provide the double-arm lever with a bellows-type sleeve affixed to a corresponding portion of the housing with a throughgoing passage receiving the lever and anchoring the fulcrum. The arms of the lever project outwardly from the sleeve and are provided respectively with the spring and the pivot means previously described. The adjustable length of the anchor permits the housing to be used with a wide variety of vehicle constructions and independently of the location at which the housing is mounted.

The above and other objects, features and advantages of the present invention will become more readily apparent from the following description, reference being made to the accompanying drawing in which.

Figure 4:
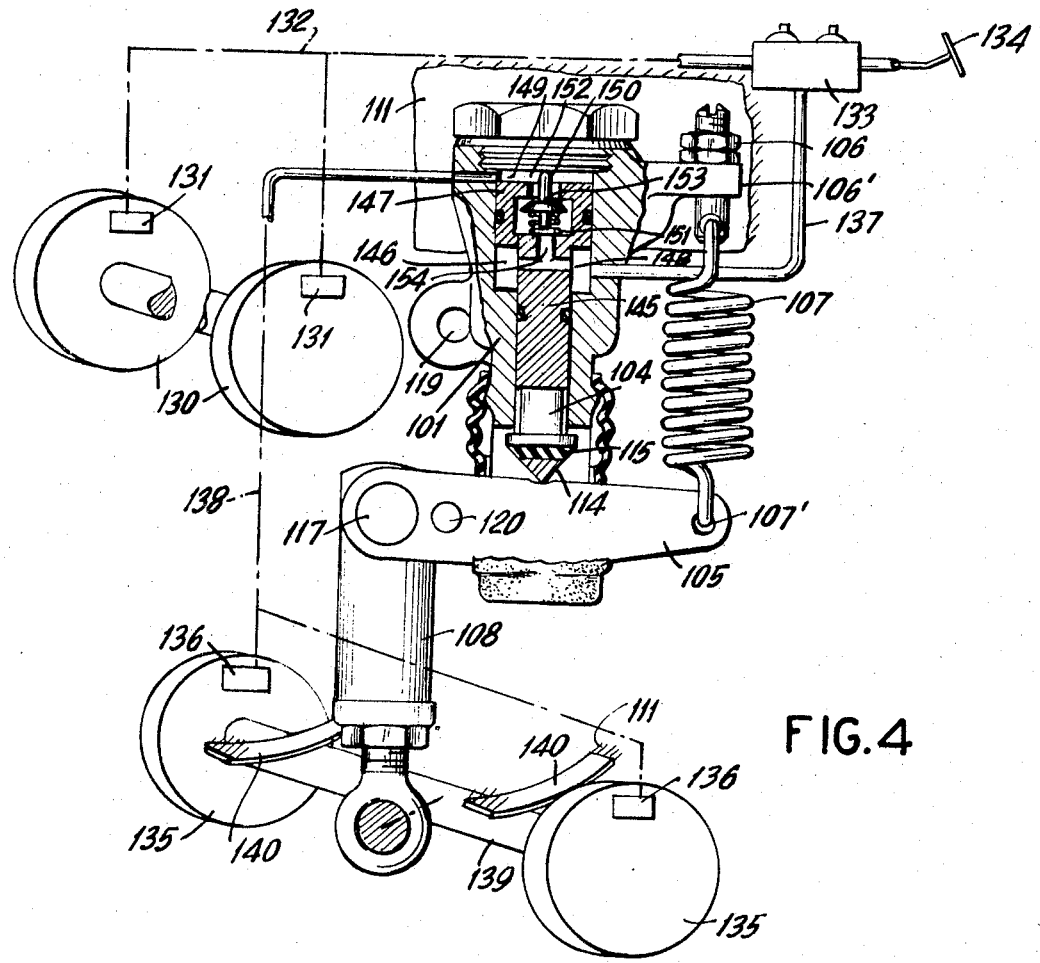
FIG. 4 is an overall view of a brake system embodying this invention with part shown diametrically and the walls of the proportioning valve broken away.

Referring first to FIG. 4, it can be seen that the vehicle basically comprises a chassis or body 111 to which the valve housing 101 may be affixed as described hereinafter with reference to FIG. 2. In addition, the vehicle has a pair of front wheels 130 whose wheel-brake cylinders, represented at 131, are connected via a transmission line 132 with a tandem master cylinder 133 carried on the chassis 111 and cooperating with a brake pedal 134. The brake fluid supplied to the rear wheels 135 at their cylinders 136 is effected via a line 137 which communicates with a port 3 (FIG. 1) of the regulator and connects the latter to the tandem master cylinder 133. The output from the regulator includes a line 138 connected at port 2 with a wheel-brake cylinder 136. The wheels 135 are in the usual manner provided with axle housings 139 which are suspended by leaf springs 140 from the chassis 111 so that the distance between the body portion of the chasis and this axle housing varies in accordance with the load on the body. In this embodiment, the valve body 101 has a plunger 104 connected with a differential piston 145 of the dual-diameter type which is axially shiftable in the step bore 146 in the housing 101.

The head 147 of the piston subdivides the bore 146 into the working chamber 148 communicating with the master cylinder 143 and in which the piston has a relatively small effective surface area and into a chamber 149 (communicating via line 138 with the rear-wheel brake cylinder 136) in which the piston 145 has a relatively large effective surface area. The piston 145 also carries a metering valve 150 which is urged by a light spring 151 in the direction of an abutment surface 152 and cooperates with a valve seat 153 formed within the piston 145. The latter is provided with a passage 154 interconnecting the chambers 148 and 149 when the plunger is in its upper extreme position as illustrated in FIG. 4. In the absence of operation of the brake, the piston 145 is held in its upper position by a spring 107 anchored at 106 to a lug 106' of the housing and at 107' to one end of a horizontal bar 105 forming the control lever. This bar 105 is fulcrumed on a knife edge 14 via an elastomeric cushion 115 to the plunger 104 and thus urges the piston 145 toward the abutment surface 152. At its other end, the lever 105 receives a pintle 117 fixed with respect to the axle housing 139 by an adjustable-length anchor system 108 whose construction is described in greater detail in connection with FIG. 1. The setting bores 119 and 120 in the housing 101 and the lever 105, respectively, receive the gauge 18.

In the absence of pressure on the pedal 134, the plunger 104 is forced into the housing 101 by the lever 105 under the action of spring 107 to urge the piston 145 upwardly and bring the metering valve 150 to bear against the surface 152 and open communication between the chambers 148 and 149. As a result, when the operator of the vehicle applies pressure to the pedal 134, this pressure is communicated directly via line 147, chamber 148, passage 154, chamber 149 and line 138 to the wheel-brake cylinders 136. As the master-cylinder pressure is increased, so is the rear-wheel cylinder pressure and $$P_{Br}=P_M$$

where $P_{Br}$ is the rear-wheel cylinder or brake pressure and $P_M$ is the master-cylinder pressure.

Concurrently, a hydraulic force F is applied to the piston 145 which can be defined as $$F=P_M(A_1-A_2)$$

where $A_1$ is the relatively large surface area exposed in chamber 149 and $A_2$ is the relatively small surface area exposed in chamber 146. At a predetermined pressure, established by the tension of spring 107, this hydraulic force becomes equal to the actuating lever force retaining the piston 145 in the upper position. Further increases in pressure displace the piston 145 downwardly (FIG. 4) until the metering valve stem no longer bears against the surface 152 and communication between chambers 136 and 139 is terminated. The master-cylinder pressure now acts via the differential piston which assists the lever force in opposing the force applied to the larger surface area and corresponding to that deliverd to the rear-wheel brakes. For a constant rear-axle load, the rear-line pressure is equal to the master-cylinder pressure until proportioning starts. Further increases in master-cylinder pressure result in proportionally less rear-wheel brake pressure in accordance with the following relationship:

$$P_{Br}=\frac{P_M(A_1-A_2'-A_3)+R_1+FO_1+FO_2-R_2}{(A_1-A_3)}$$

Where $A_1$ is the larger plunger area, $A_2'$ is the external plunger area, $A_3$ is the metering-valve seat area, $R_1$ is the force applied by the lever 105, $R_2$ is the metering-valve spring force, and $FO_1$ and $FO_2$ are the seal frictions of the larger and smaller bores. As the vehicle load increases, of course, the lever 105 will tilt about its fulcrum 114 and increases the stress of spring 107. The force necessary to displace the piston 145 will increase correspondingly.

Figure 1:
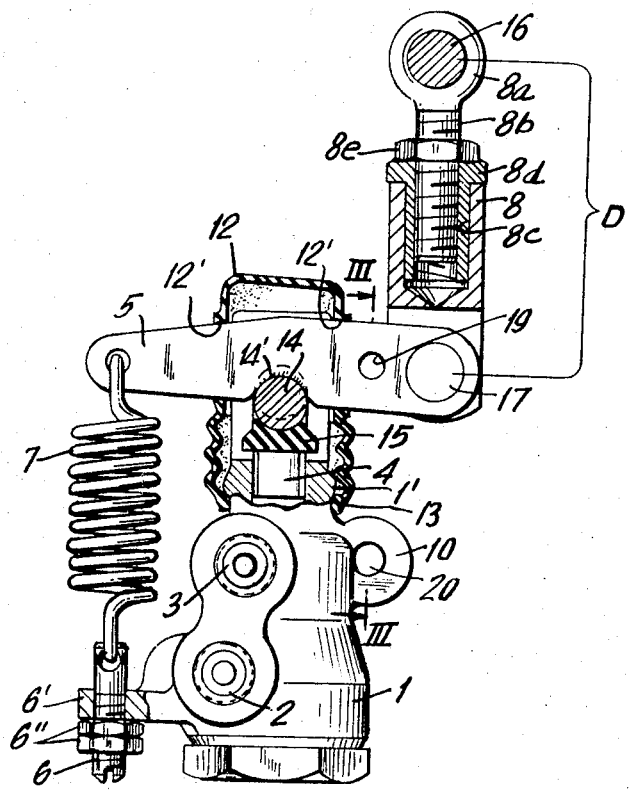
FIG. 1 is a side-elevational view, partly broken away, of a brake-force-proportioning device according to this invention.
Figure 2:
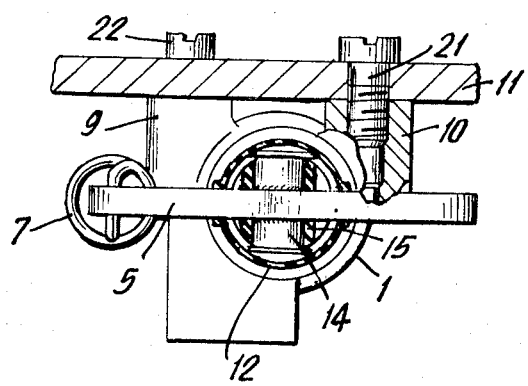
FIG. 2 is a plan view of the device with the bellows-type cap broken away.
Figure 3:
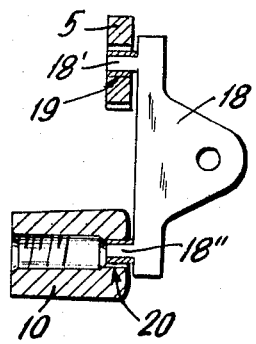
FIG. 3 is a cross section along the line III—III of FIG. 1 showing the system with the bridge piece or gauge in place.

The principles of this invention will be more readily apparent now from FIGS. 1 through 3 in which the housing 1 is shown to have the brake-line connection ports 2 and 3 for communication with the rear-wheel brake cylinders and the master cylinders as previously described. In this embodiment, the horizontal bar lever 5 consists of a unitary (i.e., one piece) member adapted to bear upon the plunger 4 of the control valve via a roller in the anti-friction system described in greater detail hereinbelow. Between the lever 5 and an adjusting screw 6, I provide a tension spring 7 which engages the left-hand arm of this lever whose right-hand arm is coupled via a pivot 17 with an anchor 8. The adjusting screw 6 is threaded into a lug 6' of the housing 1 so that, when this housing is connected with the body portion of the vehicle, the attachment of the spring 7 is tantamount to a direct connection with the body. Counteracting nuts 6' lock the screw 6 in place.

The housing 1 is provided with a pair of bosses or flanges 9 and 10 which are connected via bolts 21 and 22 with the vehicle chassis or frame 11. To prevent the passage of contaminants, oil or moisture into the valve and, therefore, the brake fluid, the housing 1 is provided with a flexible bellows-type cap or sleeve 12 whose lower bead 13 has the housing beneath a ridge 1' thereof. The cap is formed with a pair of diametrically opposite slots 12' accommodating and closely hugging the lever 5. Thus the fulcrum assembly is fully enclosed.

The fulcrum assembly, in order to maintain friction at a minimum, here comprises a roller 14 which is welded at 14' to the lever 5 and bears upon a journal block 15 composed of a low-friction synthetic-resin material of resilient compressibility. The journal block 15 may consist of hard rubber impregnated with molybdenum disulfide, a polytetrafluoroethylene block or the like. The anchorage pivotally securing the other end of the lever 5 to the axle housing as represented at 16, comprises an eye 8a formed on a shank 8b threaded into a sleeve 8c of the anchor 8. When the head 8d of the sleeve is rotated, the distance D between the pivot axis 17 and the junction 16 of the axle housing can be varied. A counternut 8a locks the setting.

Upon an increase in the load carried by the vehicle, the movement of the axle housing 16 towards the body 11 is translated via the anchor 8 and pivot 17 into a movement of the lever 5 and corresponding change in pressure upon the plungers 4. Thus each movement of the vehicle axle results in a corresponding displacement of the piston 4, the ratio between such displacements being set by changing the distance D or the pretension of spring 7 as previously described. In order to establish the correct threshold of the metering valve or plunger, the bridge piece or gauge 18, whose pins 18' and 18" are spaced apart at a predetermined distance, is inserted into the bores 19 and 20 when a predetermined load is applied to the vehicle. Thus the vehicle can be loaded to this level and the sleeve 8c or the screw 6 adjusted until the gauge fits properly.

I claim:
1. A load-responsive brake-force-proportioning device for a vehicular-brake system having a master cylinder, a set of fluid-actuated wheel brakes, a vehicle-body portion and an axle assembly suspended from said body portion whereby changes in the load carried by said body portion are reflected in a varying distance between said body portion and said axle assembly, said device comprising:

a proportioning valve interposed between said master cylinder and said wheel brakes, said valve having a housing mounted on said body portion and forming a cylinder bore, a plunger axially shiftable in said bore and subdividing said bore into a pair of working chambers respectively communicating with said master cylinder and with said wheel brakes while having a relatively large effective-surface area in the chamber communicating with said wheel brakes and a relatively small effective-surface area in the chamber communicating with said master cylinder, and valve means operable by said plunger for effective fluid communication between said chambers in one position of said plunger whereby brake force is transmitted from said master cylinder directly to said wheel brakes and another position blocking fluid communication between said chambers whereby said plunger transfers force from said master cylinder to said wheel brakes and applies brake pressure to the latter in dependence upon said area;

a unitary double-arm control lever, said lever having but a single fulcrum located on said plunger whereby said lever is tiltable thereon, and having a first arm between its fulcrum and one end and a second arm between said fulcrum and the other end of said lever, said fulcrum of said lever being shiftable relatively to said housing with said plunger;

a spring connecting one of said arms with said body portion; and anchor means for pivotally connecting the other of said arms to said axle assembly for movement therewith relative to said body portion.

2. A load-responsive brake-force proportioning device as defined in claim 1 wherein said anchor means includes a shank affixed to said axle assembly, means on said shank defining a pivotal axis with said lever, and adjusting means for varying the effective length of said shank.

3. A load-responsive brake-force-proportioning device for a vehicular-brake system having a master cylinder, a set of fluid-actuated wheel brakes, a vehicle-body portion and an axle assembly suspended from said body portion whereby changes in the load carried by said body portion are reflected in a varying distance between said body portion and said axle assembly, said device comprising:

a proportioning valve interposed between said master cylinder and said wheel brakes, said valve having a housing mounted on said body portion and forming a cylinder bore, a plunger axially shiftable in said bore and subdividing said bore into a pair of working chambers respectively communicating with said master cylinder and with said wheel brakes while having a relatively large effective-surface area in the chamber communicating with said wheel brakes and a relatively small effective-surface area in the chamber communicating with said master cylinder, and valve means operable by said plunger for effective fluid communication between said chambers in one position of said plunger whereby brake force is transmitted from said master cylinder directly to said wheel brakes and another position blocking fluid communication between said chambers whereby said plunger transfers force from said master cylinder to said wheel brakes and applies brake pressure to the latter in dependence upon said area;

a unitary double-arm control lever fulcrumed on said plunger and having a first arm between its fulcrum and one end and a second arm between said fulcrum and the other end of said lever;

a spring connecting one of said arms with said body portion;

anchor means for pivotally connecting the other of said arms to said axle assembly for movement therewith relative to said body portion; and elastomeric cushion means at said fulcrum between said lever and said plunger.

4. A load-responsive brake-force proportioning device as defined in claim 3 wherein said spring is a coil-type tension spring connecting said end of said first arm with said housing.

5. A load-responsive brake-force proportioning device as defined in claim 4, further comprising adjusting means on said housing for selectively varying the tension of said spring.

6. A load-responsive brake-force proportioning device as defined in claim 3, further comprising antifriction means at said fulcrum between said plunger and said lever.

7. A load-responsive brake-force proportioning device as defined in claim 6 wherein said antifriction means includes a roller fixed to said lever and a bearing block fixed to said plunger and forming a seat for said roller.

8. A load-responsive brake-force proportioning device as defined in claim 3 wherein said lever is a horizontal bar fulcrumed at a knife edge on said plunger.

9. A load-responsive brake-force proportioning device as defined in claim 3 wherein said lever and said housing are provided with adjusting means offset from said fulcrum for positioning said lever relative to said housing for a predetermined vehicle load.

10. A load-responsive brake-force proportioning device as defined in claim 9 wherein said adjusting means includes a hole provided in said lever offset from said fulcrum and a hole provided in said housing for receiving a gauge having pins at a fixed distance from one another receivable in the hole of said lever and the hole of said housing.

References Cited

UNITED STATES PATENTS 3,191,999  6/1965  Cordiano _____ 303—22
3,362,758  1/1968  Goerke et al. _____ 303—22

MILTON BUCHLER, Primary Examiner.

J. J. McLAUGHLIN, JR., Assistant Examiner.

U.S. Cl. X.R.

188—195; 267—64; 303—6